(12) United States Patent
Brown

(10) Patent No.: US 8,783,430 B2
(45) Date of Patent: Jul. 22, 2014

(54) TUNED VIBRATION ABSORBER FOR ACTIVE VEHICLE SUSPENSION

(75) Inventor: Steven N. Brown, Cambridge, MA (US)

(73) Assignee: Bose Corporation, Framingham, MA (US)

( * ) Notice: Subject to any disclaimer, the term of this patent is extended or adjusted under 35 U.S.C. 154(b) by 122 days.

(21) Appl. No.: 13/533,004

(22) Filed: Jun. 26, 2012

(65) Prior Publication Data
US 2013/0341143 A1  Dec. 26, 2013

(51) Int. Cl.
*F16F 7/116* (2006.01)

(52) U.S. Cl.
USPC .......................................... 188/380; 301/6.91

(58) Field of Classification Search
CPC ........... F16F 7/104; F16F 7/108; F16F 7/112; F16F 7/116; B60G 2200/156; B60G 2202/152
USPC ................... 188/378–380; 301/6.91
See application file for complete search history.

(56) References Cited

U.S. PATENT DOCUMENTS

| | | | | |
|---|---|---|---|---|
| 1,687,296 A | * | 10/1928 | Johnson | 280/759 |
| 2,746,768 A | * | 5/1956 | Bowser | 280/758 |
| 2,955,841 A | | 10/1960 | Faiver et al. | |
| 3,166,337 A | * | 1/1965 | Panzer | 280/6.158 |
| 3,446,907 A | * | 5/1969 | Bouche | 174/42 |
| 4,925,198 A | * | 5/1990 | Ito et al. | 280/89 |
| 4,991,698 A | | 2/1991 | Hanson | |
| 5,392,882 A | | 2/1995 | Mackovjak et al. | |
| 6,364,078 B1 | | 4/2002 | Parison et al. | |
| 2010/0320046 A1 | * | 12/2010 | Provost et al. | 188/380 |

FOREIGN PATENT DOCUMENTS

| | | |
|---|---|---|
| GB | 2174044 A | 10/1986 |
| WO | 92/02382 | 2/1992 |

* cited by examiner

*Primary Examiner* — Bradley King
(74) *Attorney, Agent, or Firm* — Bose Corporation

(57) ABSTRACT

An apparatus for use in an active suspension system includes a mass damper for damping a first vertical resonance of a wheel having vertical and horizontal diameters. The wheel defines a wheel plane that passes through a center of the wheel and the wheel's vertical and horizontal diameters. The wheel also defines a transverse wheel plane that is perpendicular to the wheel plane and that intersects the wheel-plane along the vertical diameter. The mass damper includes a damping mass coupled to the wheel. The damping mass is constrained from motion relative to the wheel in all but a vertical direction and has a mass distribution that is asymmetric relative to the transverse wheel plane.

15 Claims, 8 Drawing Sheets

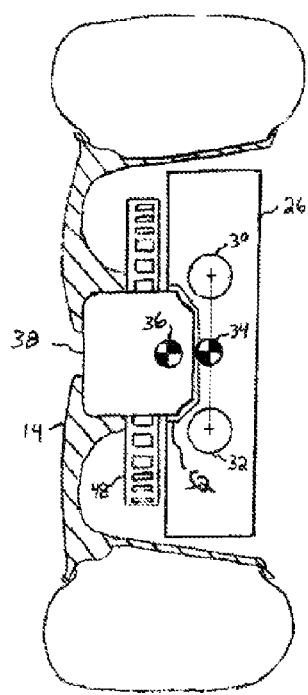 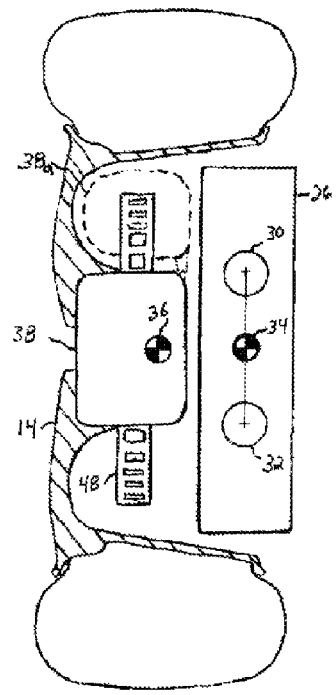 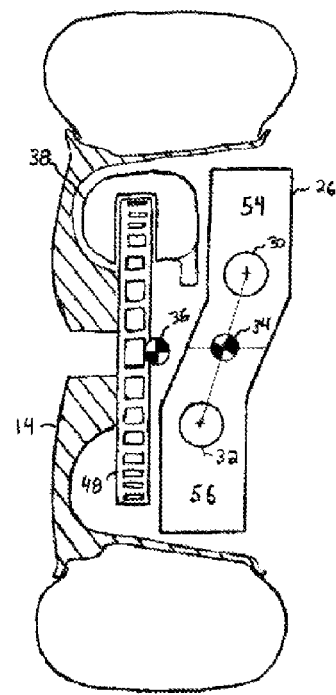
*PRIOR ART*
*FIG. 4A*     *FIG. 4B*     *FIG. 4C*

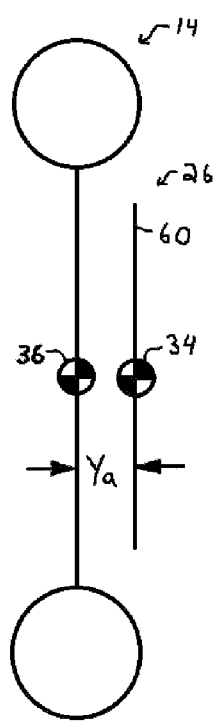
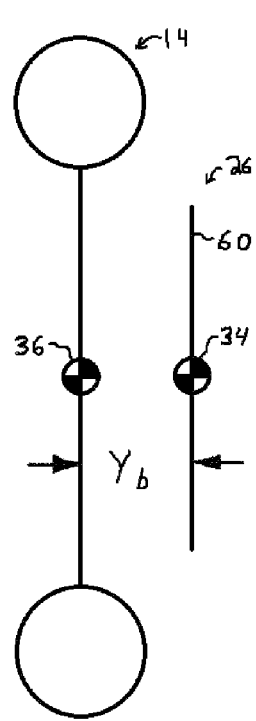
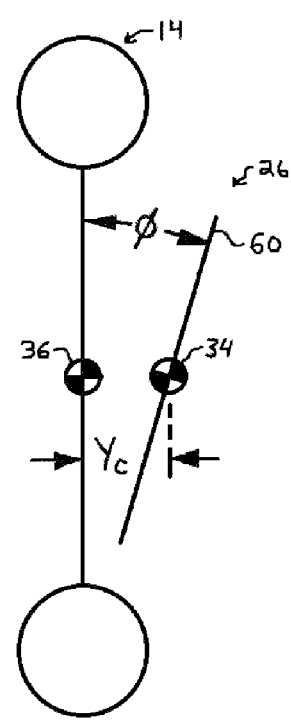
*FIG. 5A*   *FIG. 5B*   *FIG. 5C*

TUNED VIBRATION ABSORBER FOR ACTIVE VEHICLE SUSPENSION

FIELD OF DISCLOSURE

This disclosure relates to vehicle suspensions, and in particular, to active suspensions.

BACKGROUND

Among the functions of a suspension system is that of isolating the passengers of a vehicle from the jarring sensation caused by uneven road surfaces and also to keep the tire in contact with the road surface in order to maintain directional control of the vehicle. For many years, suspension systems have relied on passive systems of springs to absorb energy from encountering a bump and dampers to dissipate that energy.

Passive suspension systems are a compromise between occupant comfort and road holding ability. Active suspension systems can eliminate this trade-off since they can respond to vertical forces from the road independently of inertial forces on the body. Known active suspension systems use electromagnetic actuators at each wheel to apply vertical forces between the sprung car body and each unsprung wheel assembly of the vehicle.

A challenge that arises in active suspension systems is posed by the first vertical resonance of the unsprung wheel assembly. Without some way to suppress this resonance, the vertical contact force between tire and road can vary significantly. This, in turn, interferes with road holding ability of the tire, thus reducing the driver's directional control of the vehicle. In some cases, the un-damped resonant motion can grow large enough such that it reduces the contact force to zero. At that point, with the tire being momentarily airborne, the road holding capability of the tire becomes non-existent.

One such method to control this resonance without putting any of the damping force into the sprung body mass is to install a tuned vibration absorber, also known as a "mass damper" on each wheel of the vehicle. Packaging such a device within a wheel assembly is challenging. Known solutions have required relocating the brake caliper to a non-ideal location.

SUMMARY

The invention described herein provides a novel tuned vibration absorber solution that leaves the brake caliper in a preferred location.

In one aspect, the invention features an apparatus for use in an active suspension system. Such an apparatus includes a mass damper for damping a first vertical resonance of a wheel having vertical and horizontal diameters. The wheel defines a wheel plane that passes through a center of the wheel and the wheel's vertical and horizontal diameters. The wheel also defines a transverse wheel plane that is perpendicular to the wheel plane and that intersects the wheel-plane along the vertical diameter. The mass damper includes a damping mass coupled to the wheel. The damping mass is constrained from motion relative to the wheel in all but a vertical direction and has a mass distribution that is asymmetric relative to the transverse wheel plane.

In some embodiments, the damping mass is sized and configured to accommodate a spring-damper-bearing system.

Other embodiments also include a spring-damper-bearing system coupled to the damping mass.

Embodiments of the invention include those in which the damping mass is configured to accommodate a brake caliper. Among these are those embodiments in which the damping mass is configured to accommodate a caliper disposed at a side of the wheel.

Yet other embodiments of the invention include those in which the damping mass is configured to permit at least one suspension link to couple to the wheel.

In some embodiments, the mass distribution on a first side of the transverse wheel plane where a brake caliper is located is displaced further away from the wheel plane than the mass distribution on a second side of the transverse wheel plane is displaced away from the wheel plane.

Other embodiments also include a spring-damper-bearing system coupled to the damping mass for guiding vertical motion of the damping mass relative to the wheel. Among these are the embodiments in which the spring-damper-bearing system includes a first spring-damper-bearing assembly disposed on a first side of the transverse wheel plane and a second spring-damper-bearing-assembly disposed on a second side of the transverse wheel plane. Among these embodiments are those in which the first spring-damper-bearing-assembly is closer to the wheel plane than the second spring-damper-bearing-assembly. Such embodiments also include those in which the spring-damper-bearing-assemblies are disposed such that the second spring-damper-bearing-assembly is mounted closer to a brake caliper than the first spring-damper-bearing-assembly.

Yet other embodiments of the invention are those in which a mass axis of the damping mass is oriented in a direction toward the wheel plane, and those in which a mass axis defined by the damping mass makes a non-zero angle relative to the wheel plane.

In another aspect, the invention features an apparatus including means for damping a first vertical resonance of a wheel, the means for damping including a damping mass having a mass distribution that is asymmetric relative to a transverse wheel plane of the wheel.

Among these embodiments are those that also include means for constraining the mass distribution from motion relative to the wheel in all but a vertical direction.

Yet other embodiments include an active suspension system operatively coupled to the means for damping. Among these are embodiments that also include a motor vehicle operatively coupled to the active suspension system.

In yet another aspect, the invention features an apparatus for use in an active suspension system. Such an apparatus includes a mass damper for damping a first vertical resonance of a wheel that defines a wheel plane that passes through a center of the wheel and that is coplanar with the wheel. The mass damper includes a damping mass coupled to the wheel. The damping mass has a mass distribution that defines a mass axis thereof. This mass axis is directed along a line that intersects the wheel plane.

These and other features and advantages of the invention will be apparent from the following detailed description and the figures in which:

BRIEF DESCRIPTION OF THE FIGURES

FIGS. 4A-4B shows configurations of mass dampers with symmetric mass distributions;

FIG. 4C shows a mass damper configuration with an asymmetric mass distribution;

FIGS. 5A-5C schematically show the mass axes for the mass dampers in FIGS. 4A-4C.

DETAILED DESCRIPTION

Figure 1A:
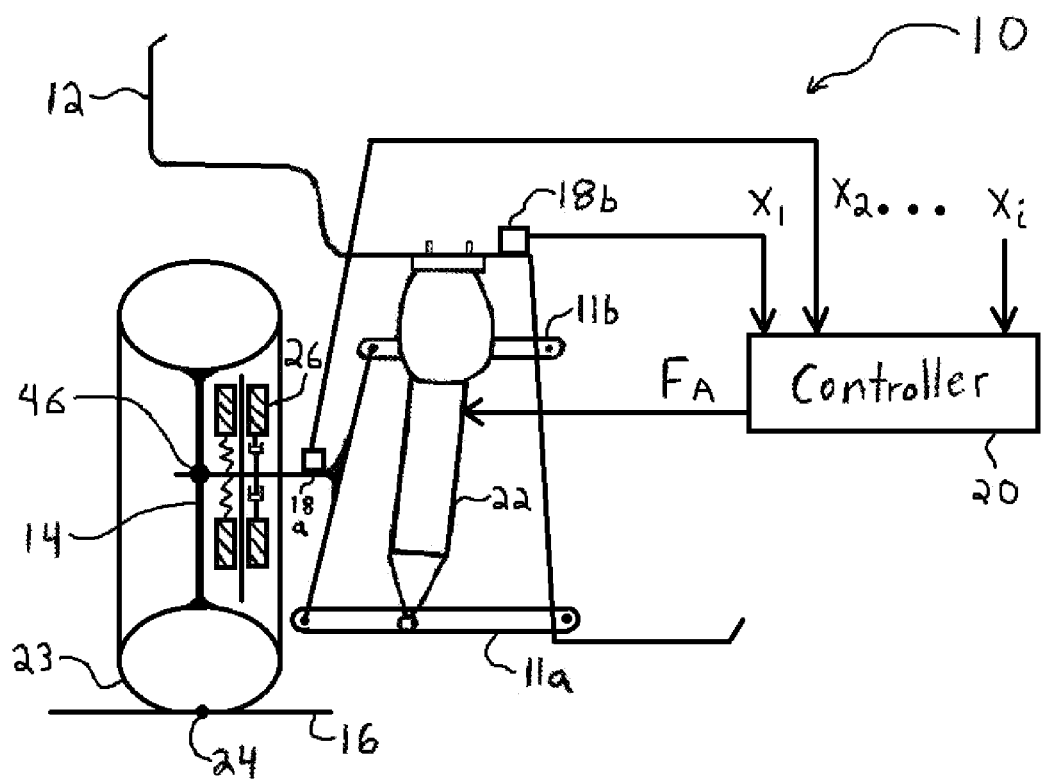
FIG. 1A is a functional block diagram of one wheel of an active suspension system.

FIG. 1A shows a single-wheel installation of an active suspension system 10 for controlling the motion of a body 12 of a vehicle in response to vibrations resulting from the unsprung wheel assemblies 14, hereinafter referred to as "wheels" 14, as they traverse a road surface 16. The illustrated system includes a wheel sensor 18a that senses wheel motions and a body sensor 18b that senses body motions. Both sensors 18a, 18b provide information $(x_1, x_2)$ indicative of such motions to a controller 20. As shown in the figure, the controller 20 can receive information from additional sensors as well.

In response to this information, the controller 20 provides a force command signal $F_A$ to control current in an electromagnetic actuator 22. This actuator 22 then exerts a force on the body 12. The controller 20 chooses a force command such that acceleration of the body 12 is minimized even as the wheel 14 encounters bumps. This effectively isolates the body 12 from the road surface 16.

A difficulty that arises in active suspension systems is that the wheel 14 is also a mass that is supported on the vertical spring of a tire 23 and thus has its own resonant frequency. An uneven road surface will cause the wheel 14 to resonate. This resonance tends to reduce the vertical force exerted by the tire 23 on the road surface 16 at a contact patch 24, and in fact reduces the size of the contact patch 24 itself. This, in turn, reduces the extent to which the tire 23 can exert horizontal forces on the road surface 16 at the contact patch 24, which in turn tends to undermine road-holding. In extreme cases, the tire 23 can even lose contact momentarily with the road surface 16.

Figure 3:
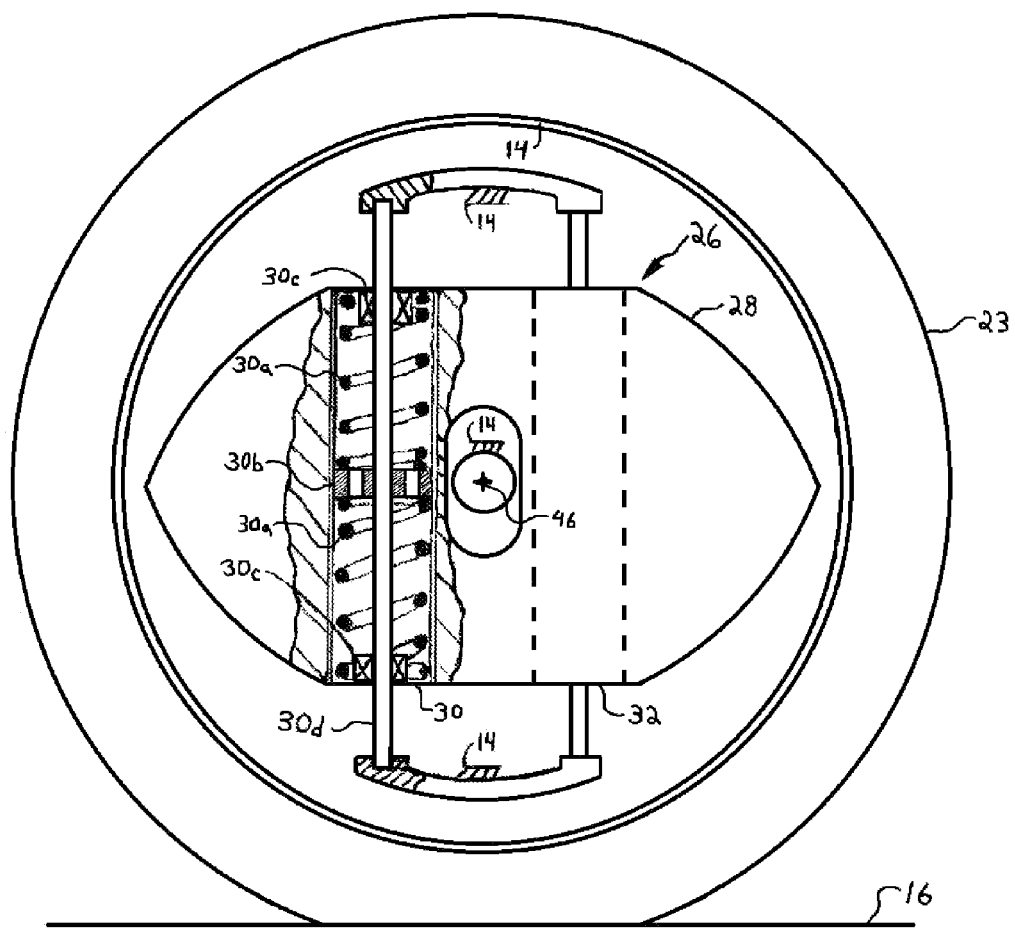
FIG. 3 is a partially sectioned side view of a mass damper and wheel assembly for use in the active suspension system of FIG. 1.

To suppress the resonance of the wheel 14, it is useful to provide a mass damper 26, shown in more detail in FIGS. 3 and 4, having a large damping mass 28 coupled to the wheel 14, yet free to move vertically relative to the wheel 14. A pair of spring-damper-bearing-assemblies 30, 32 coupled to the damping mass 28 provides spring support for the damping mass 28, hydraulically damps its motion, and guides its vertical movement. A mass damper 26 as described above tends to dampen the resonance of the wheel 14, and thus helps the tire 23 maintain a contact patch 24 with relatively constant vertical force on the road surface 16.

Figure 1B:
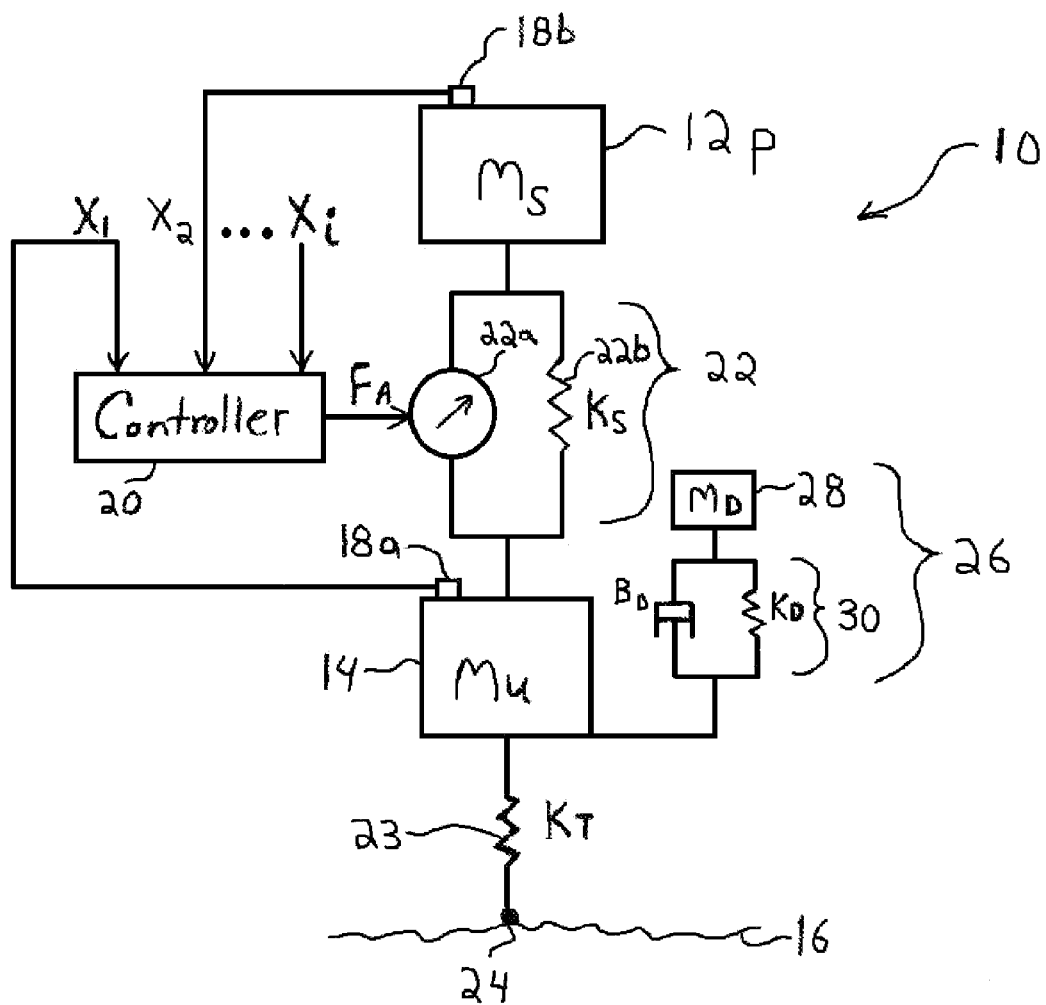
FIG. 1B is a mechanical equivalent of the system shown in FIG. 1A.

FIG. 1B is mechanical equivalent system of FIG. 1A in which $M_S$ 12p represents that portion of the total sprung mass that is supported by the wheel assembly, i.e. all mass that causes weight that is supported by the suspension, including portions of the weight of suspension members, and $M_U$ represents the unsprung mass, i.e. the mass of the unsprung wheel assembly 14, which includes all mass that causes weight that is not carried by the suspension system but is supported directly by the tire or wheel and is considered to move with the tire or wheel, $K_T$ is a spring rate function associated with the tire 23, $K_D$ and $B_D$ represent a spring rate and a damping rate functions associated with the mass damper 26, $M_D$ is the mass of the damping mass 28, $K_S$ is the spring rate function associated with the main suspension spring 22b, and the force command $F_A$ causes electromagnetic actuator 22a to exert a force between the sprung and unsprung masses.

Figure 2A:
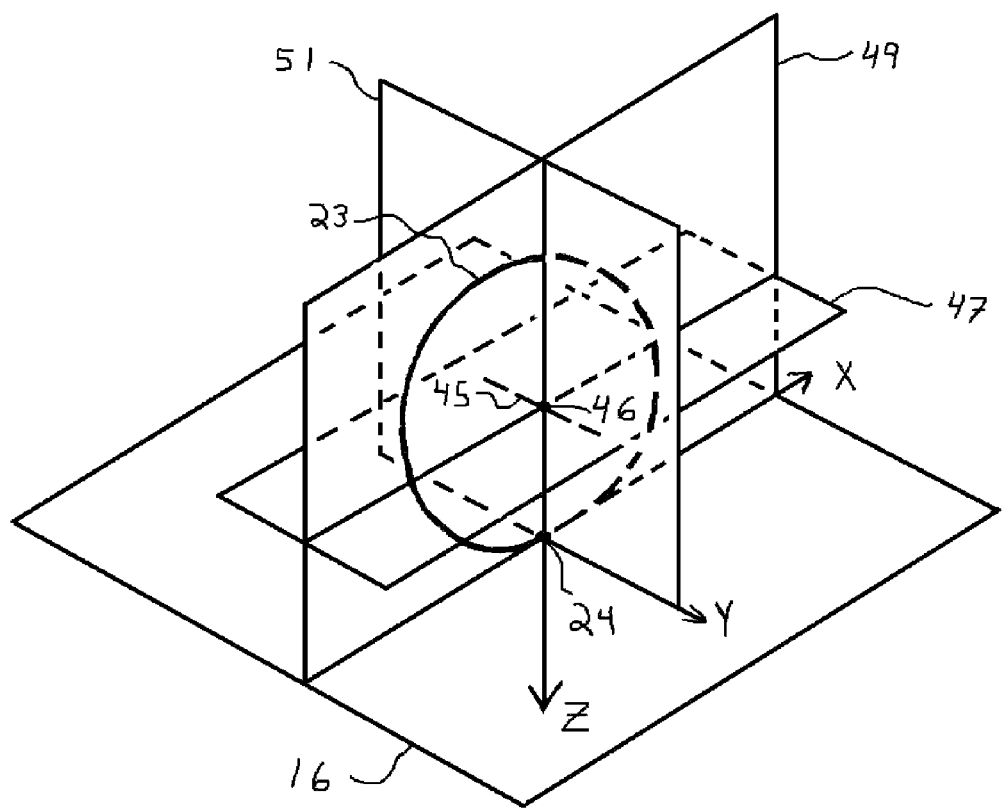
FIGS. 2A and 2B are views of a wheel in a coordinate system.
Figure 2B:
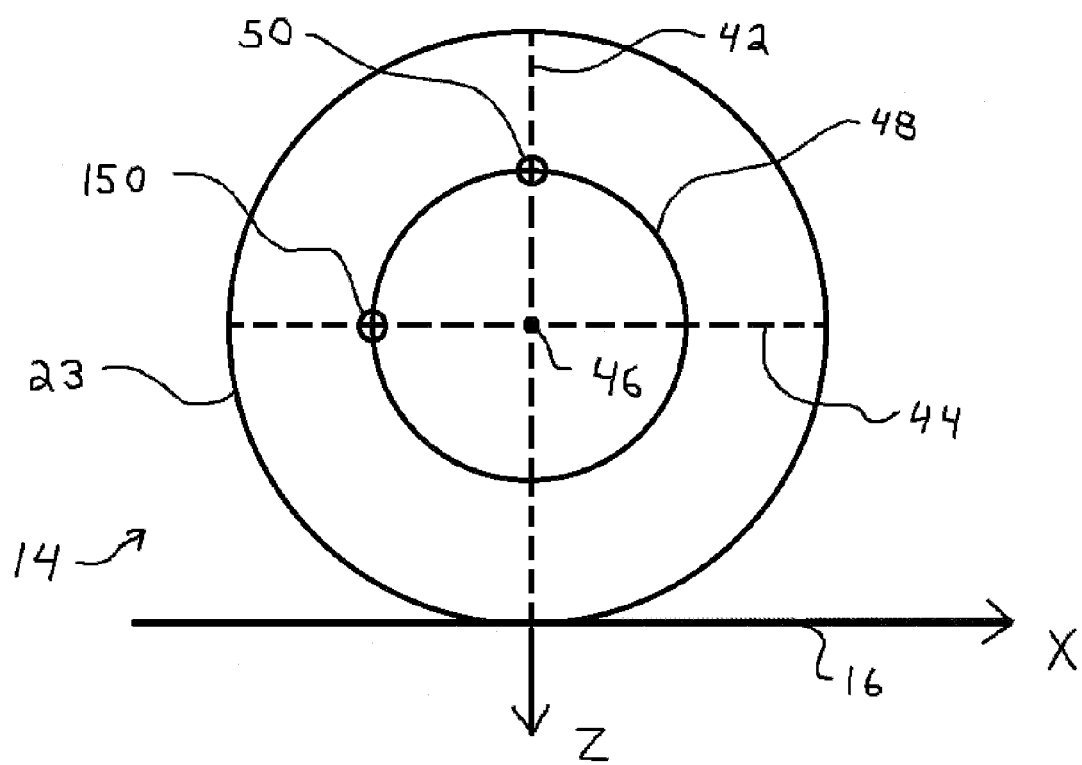

To provide a suitable frame of reference for discussion, a wheel 14, shown in FIGS. 2A and 2B, will be referred to as having a vertical diameter 42 and a horizontal diameter 44. The vertical diameter 42 is a line orthogonal to the road surface 16 and extending vertically upwards, passing through the wheel's center 46. A line passing through the wheel's center 46 and orthogonal to both the vertical diameter 42 and the horizontal diameter 44, and that defines the wheel's axis of rotation is referred to herein as the "spin axis 45." These two diameters 42, 44 define a wheel-plane 49, which is a central plane of the wheel 14. A plane perpendicular to the wheel-plane 49 and intersecting the wheel-plane 49 along the vertical diameter 42 will be referred to as the "transverse wheel plane" 51. The intersection of the wheel-plane 49 and a vertical projection of the spin axis 45 onto the road surface 16 is referred to as the "center of tire contact" 24.

The intersection of the vertical diameter 42 with a brake disc 48 within the wheel 14, which corresponds to the disc's twelve o'clock position, will be referred to as the "top" 50 of the disc 48. The horizontal diameter 44 is a line that is perpendicular to the vertical diameter 42 and intersects the vertical diameter 42 at the wheel's center 46. An intersection of the horizontal diameter 44 with the disc 48 will be referred to as the "side" 150 of the disc 48.

FIG. 3 shows a view of a mass damper 26 and wheel assembly 14. A pair of fluid-filled, spring-damper-bearing-assemblies 30, 32 is symmetrically mounted fore and aft of the wheel center 46 in a nominally vertical orientation. A portion of the damping mass 28 has been partially sectioned to reveal components within one spring-damper-bearing-assembly 30. These components include vertical positioning springs 30a to provide a variable restoring force, a variable orifice damper piston 30b to provide a variable damping force, bearings 30c, and a shaft 30d, to guide the vertical movement of the damping mass 28. Both ends of the shaft 30d are connected to the non-rotating portion on the unsprung wheel assembly 14. An oval slot in the center of the damping mass 28 provides clearance for the wheel bearings and associated spin axis 45.

FIGS. 4A-4C show three different plan view configurations of mass dampers with both symmetric (FIGS. 4A-4B) and asymmetric (FIG. 4C) mass distributions. For clarity, the wheels 14 and tires 23 have been horizontally sectioned thru the wheel centers.

In FIGS. 5A-5C, the same configurations shown in FIGS. 4A-4C have been redrawn in schematic form. Each slice of the damping mass 28 along a plane parallel with the transverse wheel plane 51 has its own center-of-mass. The set of all such centers-of-mass defines a curve which can be projected onto a horizontal wheel plane 47 that passes thru the wheel center 46. Fitting a straight line function through this curve creates a line, which will be referred to herein as the "mass axis" 60 of the damping mass 26. These corresponding mass axes 60, center-of-mass locations 34, 36 and center-of-mass lateral offsets $Y_a$, $Y_b$, and $Y_c$ are shown in FIGS. 5A-5C.

To perform its function, the mass damper 26 is best placed such that its center-of-mass 34 coincides with a center-of-mass 36 of the wheel 14. To the extent these centers-of-mass 34, 36 do not coincide, a moment arm is created between them. This moment arm can transfer a moment through the spring-damper-bearing-assemblies, into the unsprung wheel assembly, and also through the suspension links into the sprung body 12. If these moments become too large, the vehicle occupants will perceive the resulting forces into the body as objectionable, thereby degrading the overall ride comfort.

Figure 6:
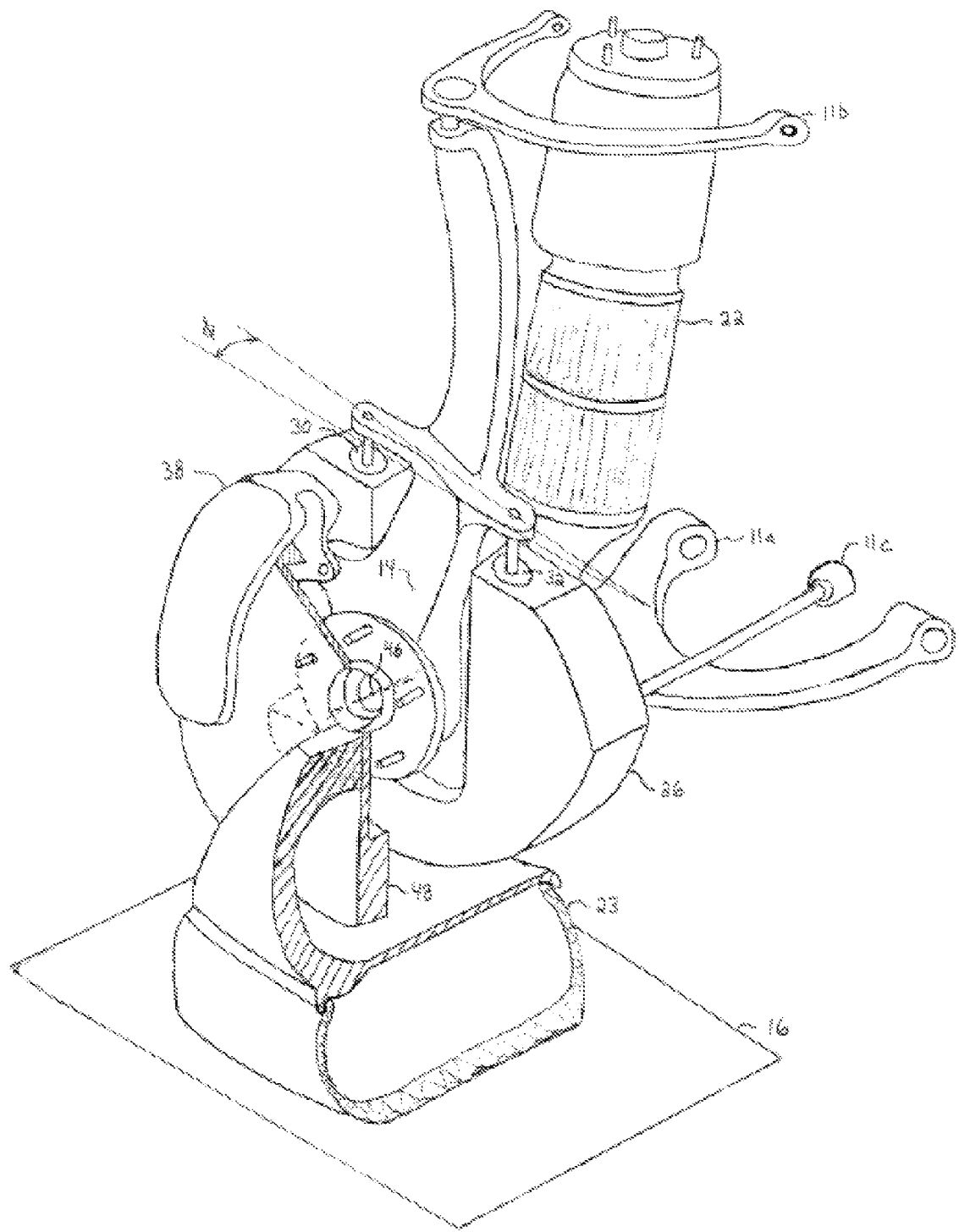
FIG. 6 is an isometric view of a single wheel installation having a mass damper configured as shown in FIGS. 4C and 5C.

However, the region within the wheel 14 has many other components, such as brake components, including the brake disc 48, brake caliper 38, and outboard ends of various suspension links 11a, 11b, 11e (not shown in FIG. 4, but visible in FIG. 6.). These components all compete with the mass damper 26 for the limited space inside the wheel 14. A difficulty that arises in providing a mass damper 26 is that of configuring the damping mass 28 in a way that enables placement of other mechanical components while ensuring the mass distribution of the damping mass 28 is adequate for performing the wheel damping function. Using a wheel 14 with deeply dished spokes allows the brake disc 48 and brake caliper 38 to be located as far outboard as possible thus providing the more space within the wheel 14 for the mass damper 26.

In a conventional arrangement as shown in FIG. 4A, the damping mass 28 is symmetric about the transverse wheel plane 51 and is placed laterally adjacent to the brake disc 48. This results in the mass damper 26 having its center-of-mass 34 separated from the wheel's center-of-mass 36 by a first gap $Y_a$, as shown in FIG. 5A. This configuration results in a short moment arm between the two centers-of-mass 34, 36. However, this configuration does not leave much room for other components of the wheel assembly, especially the brake caliper 38.

The brake caliper 38 in FIG. 4A is a floating-type brake caliper mounted at the top 50 of the brake disc 48. A lower ball joint (not shown) is mounted diametrically opposite the caliper 38, near the bottom of the brake disc 48. A pair of spring-damper-bearing-assemblies 30, 32 is then mounted symmetrically fore and aft of the wheel's center 46 on either side of the transverse wheel plane 51 and spaced as far apart as possible. These spring-damper-bearing-assemblies 30, 32 extend nominally vertically in a direction parallel to the vertical diameter 42 and are nominally equidistant from the wheel-plane 49. Their ideal lateral location is such that the center-of-mass 34 of the damping mass lies on the mid-point of a line connecting the centers of the two spring-damper-bearing-assemblies 30, 32. The damping mass 28 features a cut-out 52 to accommodate both the spring-damper-bearing assemblies 30, 32, caliper 38, and suspension components or portions thereof such as suspension links 11a, 11b, and 11e or portions of links 11a, 11b, and 11e that connect to wheel assembly 14.

In the arrangement illustrated in FIG. 4A, because no wheel bearing is infinitely stiff, lateral forces generated at the contact patch 24 while cornering create a moment on the wheel bearing. This moment forces the top 50 of the brake disc 48 to move laterally inward or outward depending on whether it is on the inner or outer wheel of the turn. Although this would tend to interfere with operation of a brake caliper 38 no matter where the caliper 38 is placed, it tends to do so more when the caliper 38 is at the top 50 of the brake disc 48, where the excursion is greatest, than when it is at the side 150 of the brake disc 48, where the excursion is least. The larger deflections associated with a top-mounted caliper preclude the use of a fixed-type brake caliper and require a floating-type caliper to prevent caliper piston "knock-back," an undesirable behavior that can result in excessive pedal travel following a "knock-back" event.

Another difficulty in the illustrated arrangement of FIG. 4A arises because the vertical extent of the spring-damper-bearing-assemblies 30, 32 restricts them to be close to each other, near the center 46 of the wheel 14. This restriction arises because of the need to incorporate the mass damper assembly within the wheel rim. As the spring-damper-bearing-assemblies 30, 32 are moved away from each other, their maximum height (and the resulting maximum travel of the damping mass) must be reduced to avoid interference with the wheel rim. If the brake caliper 38 is at the top 50 of the brake disc 48, the extent to which brake pads mounted on the caliper 38 (and the caliper itself) can extend circumferentially along the periphery of the brake disc 48, is therefore limited by the fore and aft separation between the spring-damper-bearing-assemblies 30, 32.

FIG. 4B shows an embodiment of a mass damper assembly that avoids the difficulties described above. If a caliper 38 with circumferentially longer pads is used at the top 50 of the brake disc 48, the entire mass damper assembly 26 can be relocated further inboard, farther away from the wheel plane 49 and brake disc 48. Also, in the configuration shown in FIG. 4B, with the mass damper 26 moved inboard, the caliper 38 could be relocated to a new location 38a on a side 150 of the brake disc 48, instead of the top 50 of the brake disc 48, to avoid potential interference with its operation during cornering.

In FIG. 4B, the damping mass 28 continues to be symmetric about the transverse wheel plane 51. This results in the mass damper 26 having its center-of-mass 34 separated from the wheel center-of-mass 36 by a second gap $Y_b$, as shown in FIG. 5B. This configuration results in a longer moment arm between the two centers-of-mass 34, 36 and is therefore not as desirable as the configuration of FIG. 4A. The resulting separation undermines the damping function of the mass damper 26 by putting larger moments into the body 12. However, the configuration of FIG. 4B does have the advantage of providing more room for the other components of the wheel assembly.

Another embodiment, shown in FIG. 4C, again places the caliper 38 on a side 150 of the brake disc 48. In this configuration, the spring-damper-bearing assembly 30 on the side of the transverse wheel plane 51 that includes the caliper 38 is moved further inboard, away from the wheel-plane 49 to accommodate the caliper 38. The other spring-damper-bearing assembly 32 is moved as far outboard as the brake disc 48 allows. As a result, the two spring-damper-bearing assemblies 30, 32 are no longer equidistant from the wheel-plane 49 as they were in FIGS. 4A and 4B.

In addition, the damping mass 28 shown in FIG. 4C is reconfigured so that a first portion 54, which lies on one side of the transverse wheel plane 51, is moved away from the wheel-plane 49 to provide enough space for the caliper 38. This redistribution of mass tends to move the damping mass' center-of-mass 34 away from the center-of-mass 36 of the wheel 14, in a direction away from the wheel-plane 49. To compensate for this, a second portion 56 of the damping mass 28, which is on the opposite side of the transverse wheel plane 51, is redistributed inward, toward the wheel-plane 49. This redistribution of mass tends to move the damping mass' center-of-mass 34 back toward the center-of-mass 36 of the unsprung wheel assembly 14. As a result, the net displacement in the center-of-mass 34 of the damping mass 28 in the asymmetric mass distribution shown in the embodiment of FIG. 4C is approximately half that of the displacement of the center-of-mass of the damping mass with the symmetric mass distribution shown in FIG. 4B. This results in the mass damper 26 having its center-of-mass 34 separated from the wheel's center-of-mass 36 by a third gap $Y_c$, as shown in FIG. 5C. This third gap $Y_c$ is shorter than the second gap $Y_b$, shown in FIG. 4B, thus reducing the moment arm between the two centers-of-mass 34, 36 while still providing additional space for other components of the wheel assembly. In particular, the additional clearance provided on one side of the asymmetric damping mass 28 provides space to accommodate the brake caliper 38.

The embodiment of FIG. 4C incorporates a damping mass 28 with a mass distribution on one side of the transverse wheel plane 51 that is offset from the wheel plane 49 by an amount that differs from the amount the mass distribution of the damping mass 28 on the opposite side of the transverse wheel plane 51 is offset from the wheel plane 49. The varying offset results in a damping mass with an asymmetric mass distribution. The offset allows the brake components to be optimally located on either one of the two sides 150 of the brake disc 48 while minimizing the displacement of the damping mass center-of-mass 34 with respect to the wheel center-of-mass 36. The offset of the mass distribution from the wheel plane 49 is thus greater on the side of the transverse wheel plane 51 where the brake caliper 38 is located than it is on the side of the transverse wheel plane 51 where no brake caliper is located.

As shown in FIGS. 5A and 5B, the configurations of FIGS. 4A and 4B result in a mass damper assembly 26 whose mass axis 60 is parallel to the wheel-plane 49. In contrast, the configuration of FIG. 4C results in a mass axis 60 that makes an angle 4 relative to the wheel-plane 49.

FIG. 6 shows a partially sectioned isometric view for a single wheel installation using the preferred mass damper configuration shown conceptually in FIGS. 4C and 5C.

Having described the invention, and a preferred embodiment thereof, what I claim as new, and secured by Letters Patent is:

1. An apparatus for use in an active suspension system, said apparatus comprising a mass damper for damping a first vertical resonance of a wheel having a vertical diameter and a horizontal diameter, said wheel defining a wheel plane that passes through a center of said wheel and the vertical and horizontal diameters of the wheel, and a transverse wheel plane that is perpendicular to said wheel plane and that intersects said wheel-plane along said vertical diameter, said mass damper including a damping mass coupled to said wheel, said damping mass being constrained from motion relative to said wheel in all but a vertical direction, said damping mass having a mass distribution that is asymmetric relative to said transverse wheel plane, wherein said mass distribution on a first side of said transverse wheel plane where a brake caliper is located is displaced further away from the wheel plane than the mass distribution on a second side of the transverse wheel plane is displaced away from the wheel plane.

2. The apparatus of claim 1, further comprising a spring-damper-bearing system coupled to said damping mass for guiding vertical motion of said damping mass relative to said wheel.

3. The apparatus of claim 2, wherein said spring-damper-bearing system comprises a first spring-damper-bearing assembly disposed on a first side of said transverse wheel plane and a second spring-damper-bearing-assembly disposed on a second side of said transverse wheel plane.

4. The apparatus of claim 3, wherein said first spring-damper-bearing-assembly is closer to said wheel plane than said second spring-damper-bearing-assembly.

5. The apparatus of claim 4, wherein said spring-damper-bearing-assemblies are disposed such that said second spring-damper-bearing-assembly is mounted closer to a brake caliper than said first spring-damper-bearing-assembly.

6. The apparatus of claim 1, wherein a mass axis of said damping mass is oriented in a direction toward said wheel plane.

7. The apparatus of claim 1, wherein said damping mass defines a mass axis, and wherein said mass axis makes a non-zero angle relative to said wheel plane.

8. An apparatus for use in an active suspension system, said apparatus comprising a mass damper for damping a first vertical resonance of a wheel having a vertical diameter and a horizontal diameter, said wheel defining a wheel plane that passes through a center of said wheel and the vertical and horizontal diameters of the wheel, and a transverse wheel plane that is perpendicular to said wheel plane and that intersects said wheel-plane along said vertical diameter, said mass damper including a damping mass coupled to said wheel, said damping mass being constrained from motion relative to said wheel in all but a vertical direction, said damping mass having a mass distribution that is asymmetric relative to said transverse wheel plane, and a spring-damper-bearing system coupled to said damping mass for guiding vertical motion of said damping mass relative to said wheel, wherein said spring-damper-bearing system comprises a first spring-damper-bearing assembly disposed on a first side of said transverse wheel plane and a second spring-damper-bearing-assembly disposed on a second side of said transverse wheel plane.

9. The apparatus of claim 8, wherein said damping mass is configured to accommodate a brake caliper.

10. The apparatus of claim 9, wherein said damping mass is configured to accommodate a caliper disposed at a side of said wheel.

11. The apparatus of claim 8, wherein said mass distribution on a first side of said transverse wheel plane where a brake caliper is located is displaced further away from the wheel plane than the mass distribution on a second side of the transverse wheel plane is displaced away from the wheel plane.

12. The apparatus of claim 8, wherein said first spring-damper-bearing-assembly is closer to said wheel plane than said second spring-damper-bearing-assembly.

13. The apparatus of claim 12, wherein said spring-damper-bearing-assemblies are disposed such that said second spring-damper-bearing-assembly is mounted closer to a brake caliper than said first spring-damper-bearing-assembly.

14. The apparatus of claim 8, wherein a mass axis of said damping mass is oriented in a direction toward said wheel plane.

15. The apparatus of claim 8, wherein said damping mass defines a mass axis, and wherein said mass axis makes a non-zero angle relative to said wheel plane.

* * * * *